US011794743B2

United States Patent
Matsumoto et al.

(10) Patent No.: US 11,794,743 B2
(45) Date of Patent: Oct. 24, 2023

(54) VEHICLE CONTROL METHOD AND VEHICLE CONTROL APPARATUS

(71) Applicant: NISSAN MOTOR CO., LTD., Yokohama (JP)

(72) Inventors: Michihiko Matsumoto, Kanagawa (JP); Yohei Nakamura, Kanagawa (JP); Toshiyuki Murata, Kanagawa (JP); Tetsuya Ikeda, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 152 days.

(21) Appl. No.: 16/771,858

(22) PCT Filed: Dec. 15, 2017

(86) PCT No.: PCT/JP2017/045167
§ 371 (c)(1),
(2) Date: Jun. 11, 2020

(87) PCT Pub. No.: WO2019/116554
PCT Pub. Date: Jun. 20, 2019

(65) Prior Publication Data
US 2021/0171037 A1 Jun. 10, 2021

(51) Int. Cl.
*B60W 30/18* (2012.01)
*B60W 10/184* (2012.01)
(Continued)

(52) U.S. Cl.
CPC ...... *B60W 30/18063* (2013.01); *B60W 10/08* (2013.01); *B60W 10/18* (2013.01);
(Continued)

(58) Field of Classification Search
CPC .......... B60W 30/18063; B60W 10/08; B60W 10/18; B60W 30/18118; B60W 40/068; B60W 40/076; B60W 40/08; B60W 40/13; B60W 2540/049; B60W 2540/12; B60W 2555/20; B60W 2530/10; B60W 2530/20; B60W 2540/10; B60W 2552/15; B60W 2552/40; B60W 2710/083; B60W 2710/085; B60W 2710/182; B60W 30/18027; B60W 10/184; B60W 30/181; B60W 30/18109; B60W 2520/04;
(Continued)

(56) References Cited

U.S. PATENT DOCUMENTS

| 2002/0029943 A1 | 3/2002 | Totsuka et al. | |
| 2003/0171186 A1* | 9/2003 | Okada | B60W 10/04 477/71 |

(Continued)

FOREIGN PATENT DOCUMENTS

| DE | 10339666 | * 5/2004 | ............. B60K 31/00 |
| EP | 2772397 | * 10/2011 | ............. B60W 10/08 |

(Continued)

*Primary Examiner* — Vivek D Koppikar
*Assistant Examiner* — Joan T Goodbody
(74) *Attorney, Agent, or Firm* — Foley & Lardner LLP

(57) ABSTRACT

At the time of starting a vehicle, if the vehicle is stopped even without an operation of braking the vehicle, a drive
(Continued)

force to be generated before an actual start of the vehicle is limited to or below a predetermined maximum drive force.

24 Claims, 2 Drawing Sheets

(51) Int. Cl.
*B60W 10/08* (2006.01)
*B60W 10/18* (2012.01)
*B60W 40/068* (2012.01)
*B60W 40/076* (2012.01)
*B60W 40/08* (2012.01)
*B60W 40/13* (2012.01)

(52) U.S. Cl.
CPC .... *B60W 30/18118* (2013.01); *B60W 40/068* (2013.01); *B60W 40/076* (2013.01); *B60W 40/08* (2013.01); *B60W 40/13* (2013.01); *B60W 2540/049* (2020.02); *B60W 2540/12* (2013.01); *B60W 2555/20* (2020.02)

(58) Field of Classification Search
CPC .... B60W 10/06; B60W 10/188; B60W 40/06; B60W 40/12; B60T 2201/06; B60T 7/02; B60T 7/122; B60T 7/12; B60Y 2300/18025; B60L 15/00; F02D 29/02
See application file for complete search history.

(56) References Cited

U.S. PATENT DOCUMENTS

| | | | | |
|---|---|---|---|---|
| 2006/0287798 | A1* | 12/2006 | Inoue | B60W 10/10 701/70 |
| 2013/0124021 | A1* | 5/2013 | Chung | B60W 30/18063 903/930 |
| 2015/0321675 | A1* | 11/2015 | Park | B60W 30/18118 701/53 |
| 2017/0113700 | A1* | 4/2017 | Kaneko | B60T 7/22 |
| 2018/0141549 | A1* | 5/2018 | Kelly | B60K 31/04 |

FOREIGN PATENT DOCUMENTS

| | | | | |
|---|---|---|---|---|
| JP | 11-6448 | A | 1/1999 | |
| JP | 2001-020775 | A | 1/2001 | |
| JP | 2002-087231 | A | 3/2002 | |
| JP | 2007-168650 | A | 7/2007 | |
| JP | 2008-201182 | A | 9/2008 | |
| JP | 2009-012655 | A | 1/2009 | |
| JP | 2009-062845 | A | 3/2009 | |
| JP | 2009-214580 | A | 9/2009 | |
| JP | 2012-16987 | A | 1/2012 | |
| JP | 2012-057708 | A | 3/2012 | |
| JP | 2016169685 | | * 3/2012 | ............ F16D 48/02 |
| JP | 2013-060197 | A | 4/2013 | |
| JP | 2014-172501 | A | 9/2014 | |
| JP | 2016-169685 | A | 9/2016 | |
| KR | 20060045762 | | * 4/2005 | ...... B60W 30/18063 |

* cited by examiner

VEHICLE CONTROL METHOD AND VEHICLE CONTROL APPARATUS

TECHNICAL FIELD

The present invention relates to a vehicle control method and a vehicle control apparatus.

BACKGROUND ART

There is disclosed a prior art (refer to Patent Literature 1) that suppresses a start-time strange brake noise by outputting, if a drive request is detected during the stoppage of a vehicle, a drive force (drive power), which is less than a drive force based on the drive request, to an axle.

CITATION LIST

Patent Literature

Patent Literature 1: Japanese Unexamined Patent Application Publication No. 2007-168650

SUMMARY OF INVENTION

Problems to be Solved by Invention

However, using the above-mentioned prior art results in reducing a start-time drive force, and therefore, causes a problem to deteriorate a start-time acceleration performance.

In consideration of the above-mentioned problem, an object of the present invention is to provide a vehicle control method and a vehicle control apparatus capable of improving an acceleration performance when starting a vehicle that is stopped.

Means to Solve Problems

A vehicle control method according to an aspect of the present invention limits, at the time of starting a vehicle, if the vehicle is stopped even without an operation of braking the vehicle, a drive force to be generated before an actual start of the vehicle to or below a predetermined maximum drive force.

Effects of Invention

According to the present invention, an acceleration performance at the time of starting a vehicle that is stopped can be improved.

MODE OF IMPLEMENTING INVENTION

With reference to the drawings, embodiments of the present invention will be explained in detail. In the explanation, the same parts are represented with the same reference marks to omit repetitive explanation.

Figure 1:
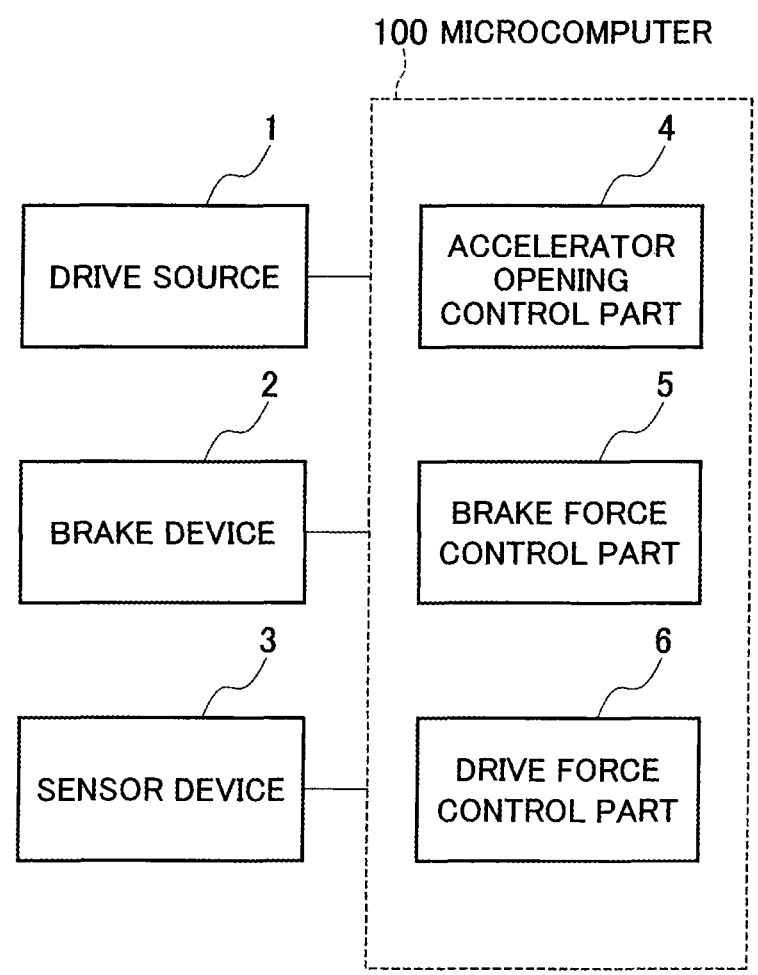
FIG. 1 is a block diagram illustrating a part of a vehicle and a vehicle control apparatus according to an embodiment of the present invention.

As illustrated in FIG. 1, a vehicle according to an embodiment is provided with a drive source 1, a brake device 2, a sensor device 3, and a microcomputer 100. Hereunder, the vehicle of FIG. 1 is called an own vehicle.

The drive source 1 herein is a motor and a battery for supplying electric power to the drive source 1 (motor) can be charged with, for example, electric power generated by rotating a generator by an internal combustion engine. By the way, the drive source 1 may be the internal combustion engine itself.

The brake device 2 is one that basically operates according to a brake operation by a driver, and herein, is a hydraulic brake device. The brake device 2 operates, by controlling an oil pressure, even without a brake operation by the driver. The brake device 2 receives an oil pressure control signal for controlling an oil pressure of the brake device 2, and according to the oil pressure control signal, controls a brake force. The oil pressure control signal is set to one of a value indicating that an oil pressure must be held (called a pressure hold instruction value) and a value indicating that an oil pressure must be decreased (called a pressure decrease instruction value). In case of the pressure hold instruction value, the brake device 2 holds an oil pressure to apply a brake force to the vehicle, and in case of the pressure decrease instruction value, decreases an oil pressure to decrease a brake force as time passes, and before long, zeroes the brake force.

The sensor device 3 includes a plurality of different kinds of object detection sensors such as a laser radar, a millimeter-wave radar, and a camera installed on the own vehicle to detect objects around the own vehicle. The sensor device 3 uses the plurality of object detection sensors and detects objects around the own vehicle.

Also, the sensor device 3 detects internal conditions of the own vehicle with a various kinds of sensors installed in the own vehicle.

The sensor device 3 here is assumed to be able to measure (1) a friction coefficient $\mu$ of a road surface at a position of the own vehicle, (2) a weight W of the own vehicle, (3) the number of persons N in the own vehicle, (4) a load T of the own vehicle, and (5) an inner pressure p of a tire of the own vehicle. Also, it is assumed to be able to measure (6) an up-slope gradient U of a road surface, (7) a down-slope gradient D of a road surface, (8) a wind velocity aw of a wind the own vehicle receives from the front, and (9) a wind velocity fw of a wind the own vehicle receives from the back.

The microcomputer 100 corresponds to the vehicle control apparatus according to the embodiment and includes an accelerator opening control part 4 for generating an accelerator opening signal that indicates an opening of an accelerator (hereunder called an accelerator opening) of the own vehicle, a brake force control part 5 for generating the oil pressure control signal to control an oil pressure of the brake device 2, and a drive force control part 6 for controlling a drive force (torque) generated by the drive source 1. The brake force control part 5 also functions as a brake keeping device that keeps the operation of the brake device 2 even if the driver stops a brake operation and releases the operation of the brake device 2 when the driver conducts a start operation.

The microcomputer 100 is a general-purpose microcomputer provided with a CPU (central processing unit), a memory, and an input/output part. The microcomputer 100 is installed with a computer program (a vehicle control program) to function as the vehicle control apparatus. By executing the computer program, the microcomputer 100 functions as a plurality of information processing circuits (4 to 6). The plurality of information processing circuits (4 to 6) explained here are examples that are realized by software. Naturally, it is possible to prepare exclusive-use hardware for executing information processes mentioned below, to constitute the information processing circuits (4 to 6). Further, the plurality of information processing circuits (4 to 6) may be formed with individual hardware pieces. In addition, the information processing circuits (4 to 6) may be in common with electronic control units (ECUs) used for other control purposes concerning the vehicle.

The accelerator opening control part 4 generates the accelerator opening signal indicating an accelerator opening corresponding to a depressed amount of an accelerator pedal of the own vehicle. Here, the accelerator opening control part 4 is configured to generate an accelerator opening signal indicating a required accelerator opening even when the own vehicle is in automated driving.

The brake force control part 5 outputs the oil pressure control signal, and when the driver of the own vehicle conducts a brake operation, this oil control signal indicates the pressure hold instruction value to hold an oil pressure of the brake device 2. Here, even when the driver of the own vehicle is not conducting a brake operation, the oil pressure control signal indicates the pressure hold instruction value if predetermined conditions are met.

For example, when the own vehicle is in automated driving, the oil pressure control signal indicates the pressure hold instruction value in case of needing a brake force. More precisely, the oil pressure control signal indicates the pressure hold instruction value if a brake force is needed at a follow running during automated driving on a congested road.

Further, in some cases, the oil pressure control signal indicates the pressure hold instruction value even when the foot is away from a brake pedal on a slope or the like. Also, in some cases, the oil pressure control signal keeps the pressure hold instruction value when the brake pedal is operated for a predetermined time or longer at the time of waiting for a traffic signal or the like even if the foot is removed from the brake pedal. In addition, when an accelerator opening changes from 0 (zero) to above 0 (zero), i.e., at the time of a start request, the oil pressure control signal switches from the oil pressure instruction value to the pressure decrease instruction value to decrease the oil pressure of the brake device 2.

The drive force control part 6 controls the drive source 1 such that, while an accelerator opening is above 0, i.e., while there is a start request, the drive source 1 generates a drive force corresponding to the accelerator opening. Hereunder, this drive force is called a "main drive force".

Also, the drive force control part 6 controls the drive source 1 such that, if a transmission of the own vehicle is not neutral even when the accelerator opening is 0, the drive source 1 generates a drive force. Namely, the drive force control part 6 controls the drive source 1 to generate a drive force even before the own vehicle actually starts. This is, for example, to make persons in the vehicle feel a force like a creep force that is generated during an idling of an internal combustion engine in a vehicle installed with the internal combustion engine and a torque converter. Hereunder, this drive force is called a "creep force".

And, the drive force control part 6 controls the creep force equal to or less than a predetermined maximum drive force during a period until a brake force decreases to a predetermined brake force threshold value or below. Here, the brake force threshold value is considered to be 0 (zero) and the maximum drive force 0 (zero). With this, during the generation of a brake force, the generation of the creep force is suppressed. By the way, the brake force threshold value is not limited to 0 (zero). Also, the maximum drive force is not limited to 0 (zero). For example, they may be set according to the degree of a shock felt by the persons in the own vehicle due to a start-time acceleration (G) fluctuation, or according to a required acceleration performance.

Figure 2:
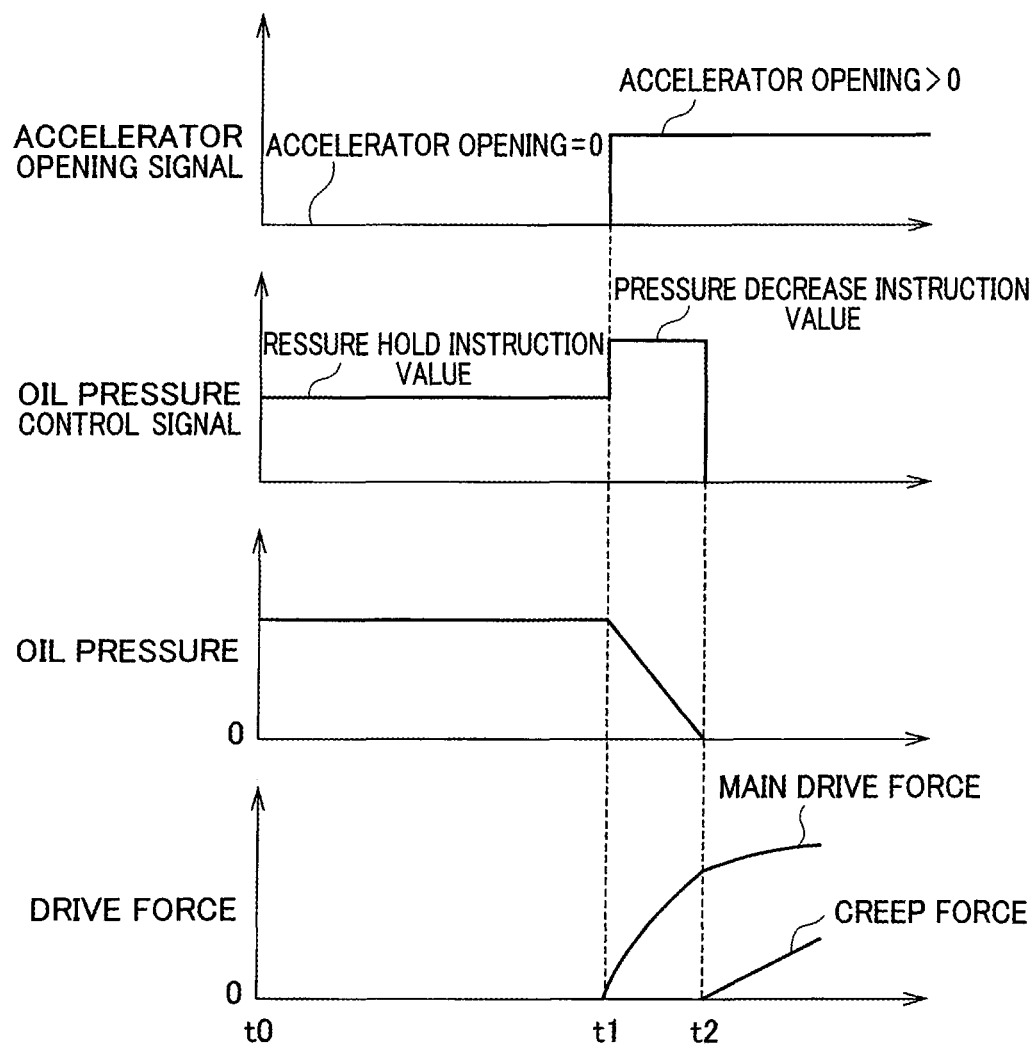
FIG. 2 is a timing chart illustrating temporal changes in an accelerator opening signal indicating an accelerator opening, an oil pressure control signal for controlling an oil pressure of a brake device, an oil pressure of the brake device, and a drive force.

With reference to FIG. 2, operation of the own vehicle will be explained in time series. Here, it is assumed that the transmission of the own vehicle is set to a drive forward instead of a neutral.

As illustrated in FIG. 2, at time t0, the driver of the own vehicle is not operating the accelerator and the accelerator opening signal indicates that the accelerator opening is 0. Further, at the time t0, the driver is not operating the brake but the oil pressure control signal indicates the pressure hold instruction value. Namely, the brake force control part 5 operates as the brake keeping device so that the oil pressure of the brake device 2 is held. Namely, the brake device 2 keeps a brake force even if there is no brake operation of the own vehicle, thereby keeping the own vehicle stopped.

By the way, even when the own vehicle is in automated driving, if the oil pressure control signal indicates the pressure hold instruction value, i.e., if the brake force control part 5 operates as the brake keeping device, the oil pressure and brake force are maintained to stop the own vehicle.

Further, at the time t0, the accelerator opening is 0 (zero), and therefore, the main drive force is 0 (zero) and the creep force is also 0 (zero) because the oil pressure is not 0 (zero) and is providing a brake force.

Here, at time t1 after the time t0, it is assumed that the accelerator opening changes from 0 (zero) to above 0 (zero).

At the time t1, the oil pressure control signal changes from the pressure hold instruction value to the pressure decrease instruction value. With this, the oil pressure of the brake device 2 starts to decrease.

On the other hand, at the time t1, the main drive force starts to increase and the own vehicle starts. Namely, without decreasing the main drive force, the main drive force corresponding to the accelerator opening is applied to the own vehicle, and therefore, an acceleration performance at the time of starting the stopped own vehicle can be improved. In case of automated driving, without a driver's accelerator operation, the own vehicle starts and an acceleration performance of this case can also be improved.

At the time t1, the oil pressure is greater than 0 (zero), i.e., the brake force is greater than the brake force threshold value, and therefore, the creep force is 0 (zero). Accordingly, for the persons in the own vehicle, there is no shock due to a start-time acceleration (G) fluctuation and the start is smooth. For example, like a follow running during automated driving on a congested road, even in a scene that the persons easily feel a start-time shock, the start-time shock can be suppressed without sacrificing an acceleration performance.

And, at time t2 after the time t1, the oil pressure of the brake device 2 becomes 0 (zero), i.e., the brake force decreases to or below the brake force threshold value. The decrease of the brake force to or below the brake force threshold value results in generating a creep force and the creep force increases as time passes. Also, after passing the time t2, an increase (a gradient with respect to time) per unit time of the main drive force becomes smaller than that before the time t2. With this, an increase in a total drive force inclusive of the creep force (a sum of the main drive force and creep force) per unit time is controlled to be roughly the same before and after the time t2. Accordingly, it is possible not to make the persons in the own vehicle feel a shock at the time t2 due to the creep force. Here, even if an increase per unit time of the total drive force changes to some extent before and after the time t2, the own vehicle is already started at the time t2, and therefore, the shock due to the creep force will hardly be felt.

Further, as the requested drive force value corresponding to an accelerator opening increases, the brake force threshold value can be increased to early generate the creep force, to thereby early obtain, in combination with the main drive force, a high acceleration performance. Also, if the requested drive force value is small, the probability of the persons in the vehicle feeling a start-time shock can be reduced.

Further, a decrease per unit time of the oil pressure can be enlarged to quickly terminate the brake force, thereby further improving the acceleration performance. For example, as the requested drive force value increases, the decrease per unit time of the brake force is enlarged. With this, the acceleration performance can be improved. Also, if the requested drive force value is small, the probability of the persons in the vehicle feeling a start-time shock can be reduced.

For example, compared to a case that the driver releases a brake operation to decrease a brake force, the brake keeping device keeps the brake force even if the driver stops the brake operation, and when this brake force is released and decreased, the decrease per unit time of the brake force is made smaller. With this, the probability of the persons in the vehicle feeling a start-time shock can be reduced. On the other hand, when the driver releases a brake operation and the shock is hardly felt, an acceleration performance can be improved.

Here, a start from a situation that the brake device 2 is operating according to a brake operation of the driver will be explained in comparison with the operation of FIG. 2.

Differences from the operation of FIG. 2 are that, when the driver stops the brake operation, the oil pressure control signal changes from the pressure hold instruction value to the pressure decrease instruction value, that, when the driver carries out an accelerator operation (start operation), the accelerator opening changes from 0 (zero) to above 0 (zero), and that the creep force occurs before the vehicle actually starts.

Preferably, the creep force generated before the vehicle actually starts is set to be greater than the maximum drive force. For example, even before the brake force decreases to or below the brake force threshold value, the creep force is generated and the magnitude of the creep force is set to be greater than the maximum drive force.

Namely, when the vehicle is started according to the brake release and accelerator operation by the driver, the driver hardly feels a start-time shock, and therefore, increasing the creep force greater than the maximum drive force can improve an acceleration performance more than a case that the start-time shock is easily felt. Namely, it is possible to reflect an acceleration intention of the driver on a starting performance.

As mentioned above, according to the embodiment, at the time of starting the own vehicle (t1), if the own vehicle is stopped without a brake operation of the own vehicle, the drive force (creep force) generated before the own vehicle actually starts is limited to or below the predetermined maximum drive force.

Namely, without decreasing the main drive force, only the creep force is limited, thereby improving an acceleration performance at the time of starting the own vehicle that is stopped. Also, when the own vehicle is stopped without an operation of braking the own vehicle, the probability of the persons in the vehicle feeling a start-time shock is high. However, limiting the creep force can lower the shock feeling probability. Namely, a drive force fluctuation due to the creep force can be suppressed, and in addition, an acceleration performance can be improved, thereby improving a starting performance.

For example, if only a rise inclination of the drive force is made smaller, a sudden decrease in the brake force will cause a steep increase in the drive force. However, like the embodiment, until the brake force decreases to or below the brake force threshold value, the creep force is limited to or below the maximum drive force, and when the brake force decreases to or below the brake force threshold value, the limitation is released, thereby preventing the sudden decrease in the brake force from steeply increasing the drive force.

Further, the own vehicle is provided with the brake device 2 that operates according to a brake operation by the driver and the brake keeping device (brake force control part 5) that keeps the operation of the brake device 2 even if the driver stops the brake operation and releases the operation of the brake device 2 when the driver carries out a start operation.

And, when the brake keeping device acts (when the brake keeping device releases the brake), the drive force (creep force) is limited to or below the maximum drive force, and when the brake device 2 acts based on a brake operation by the driver, the drive force (creep force) is increased greater than the maximum drive force.

Namely, it is unclear when the driver releases the brake operation, and therefore, the drive force (creep force) is increased greater than the maximum drive force to improve a responsiveness. On the other hand, when the brake keeping device acts, the start-time shock can be suppressed and the acceleration performance can be improved.

Also, when starting from the state that the brake keeping device is acting, until the brake force of the brake device 2 decreases to or below the brake force threshold value, the drive force (creep force) is limited to or below the maximum drive force. On the other hand, when starting from the state that the brake device 2 is acting based on a brake operation by the driver, the drive force (creep force) is increased greater than the maximum drive force.

Namely, it is unclear when the driver releases the brake operation, and therefore, the drive force (creep force) is increased greater than the maximum drive force to improve a responsiveness. On the other hand, when there is no starting intention of the driver, the start-time shock suppression can be emphasized.

Further, after the end of the drive force limitation (creep force), the drive force (creep force) is increased as time passes, to improve an after-start acceleration performance by the main drive force, i.e., to further improve an acceleration performance at the time when the start-time shock is hardly felt.

Further, employing a motor as the drive source 1 of the own vehicle can effectively use an acceleration capacity of the motor, which is higher than that of an internal combustion engine, thereby improving the acceleration performance of the own vehicle.

By the way, the brake device 2 may be a brake device other than that of an oil pressure type. If the brake force thereof is controlled like the above-mentioned oil-pressure brake force, an effect similar to that of the embodiment is obtainable.

Modifications

Modifications of the embodiment will be explained. Among the plurality of modifications explained below, those that can be combined with one another can be combined together for implementation.

Modifications A1 to A7 detect factors influencing the start of the own vehicle, and according to the factors, control an increase per unit time of the drive force (creep force). With this, the factors can be reflected on the increase per unit time of the drive force (creep force), to more precisely control a start-time performance of the own vehicle.

Modifications B1 to B7 detect factors influencing the start of the own vehicle, and according to the factors, set the maximum drive force. With this, the factors can be reflected on the maximum drive force, to more precisely control the start-time performance of the own vehicle.

Modifications C1 to C7 detect factors influencing the start of the own vehicle, and according to the factors, control the brake force of the brake device 2. With this, the factors can be reflected on the brake force, to more precisely control the start-time performance of the own vehicle.

Modification A1

In the Modification A1, the sensor device 3 detects, as an external force preventing the start of the own vehicle, a friction coefficient $\mu$ of a road surface at a position of the own vehicle.

And, after the end of the drive force limitation, i.e., after the time t2 of FIG. 2, the drive force control part 6 increases the creep force as time passes and enlarges an increase (an increasing tendency) per unit time of the creep force as the magnitude of the friction coefficient $\mu$ becomes larger.

Namely, the larger the friction coefficient $\mu$ (the external force preventing the start of the own vehicle), the larger the increase per unit time of the creep force. Accordingly, together with the main drive force, the acceleration performance can further be improved.

Also, if the friction coefficient $\mu$ is small, the increase per unit time of the creep force is also small, and therefore, the probability of the persons in the vehicle feeling a start-time shock can be reduced. In addition, it is possible to prevent an incident that the own vehicle starts like dashing forward.

Modification A2

In the Modification A2, the sensor device 3 detects, as an external force preventing the start of the own vehicle, a weight W of the own vehicle. Instead of the weight W, the number of persons N in the own vehicle or a load T may be detected.

And, after the end of the drive force limitation, i.e., after the time t2 of FIG. 2, the drive force control part 6 increases the creep force as time passes and enlarges the increase per unit time of the creep force as the weight W (or the number of persons N or the load T) increases.

Namely, the larger the external force preventing the start of the own vehicle, the larger the increase per unit time of the creep force. Accordingly, together with the main drive force, the acceleration performance can further be improved.

Also, if the weight W (or the number of persons N or the load T) is small, the increase per unit time of the creep force is also small, and therefore, the probability of the persons in the vehicle feeling a start-time shock can be reduced. In addition, it is possible to prevent an incident that the own vehicle starts like dashing forward.

Modification A3

In the Modification A3, the sensor device 3 measures, as an easiness of the start of the own vehicle, a tire pressure p of the own vehicle.

And, after the end of the drive force limitation, i.e., after the time t2 of FIG. 2, the drive force control part 6 increases the creep force as time passes and makes the increase per unit time of the creep force smaller as the pressure p becomes higher.

Namely, the larger the pressure p (the easiness of the start of the own vehicle), the smaller the increase per unit time of the creep force, to prevent a sudden acceleration increase after the end of the drive force limitation. Accordingly, the acceleration performance can further be improved and the probability of the persons in the vehicle feeling a start-time shock can be reduced. In addition, it is possible to prevent an incident that the own vehicle starts like dashing forward.

Also, when the pressure p is small, the increase per unit time of the creep force becomes larger, thereby further improving the acceleration performance.

Modification A4

In the Modification A4, the sensor device 3 measures, as an external force preventing the start of the own vehicle, an up-slope gradient U of a road surface. The up-slope gradient U is measurable with the use of an acceleration sensor.

And, after the end of the drive force limitation, i.e., after the time t2 of FIG. 2, the drive force control part 6 increases the creep force as time passes and makes the increase per unit time of the creep force larger as the up-slope gradient U becomes larger.

Namely, the larger the up-slope gradient U (the external force preventing the start of the own vehicle), the larger the increase per unit time of the creep force. Accordingly, together with the main drive force, the acceleration performance can further be improved. In addition, it can prevent the own vehicle from sliding backward.

Also, if the up-slope gradient U is small, the increase per unit time of the creep force is also small, and therefore, the probability of the persons in the vehicle feeling a start-time shock can be reduced. Further, it is possible to prevent an incident that the own vehicle starts like dashing forward.

Modification A5

In the Modification A5, the sensor device 3 measures, as an external force preventing the start of the own vehicle, a wind velocity aw of a wind the own vehicle receives from the front.

And, after the end of the drive force limitation, i.e., after the time t2 of FIG. 2, the drive force control part 6 increases the creep force as time passes and enlarges the increase per unit time of the creep force as the wind velocity aw increases.

Namely, the larger the wind velocity aw (the external force preventing the start of the own vehicle), the larger the increase per unit time of the creep force. Accordingly, together with the main drive force, the acceleration performance can further be improved.

Also, if the wind velocity aw is small, the increase per unit time of the creep force is also small, and therefore, the probability of the persons in the vehicle feeling a start-time shock can be reduced. In addition, it is possible to prevent an incident that the own vehicle starts like dashing forward.

Modification A6

In the modification A6, the sensor device 3 measures, as an external force expediting the start of the own vehicle, a down-slope gradient D of a road surface. The down-slope gradient D is measurable with the use of the acceleration sensor.

And, after the end of the drive force limitation, i.e., after the time t2 of FIG. 2, the drive force control part 6 increases the creep force as time passes and makes the increase per unit time of the creep force smaller as the down-slope gradient D increases.

Namely, the larger the down-slope gradient D (the external force expediting the start of the own vehicle), the smaller the increase per unit time of the creep force. Accordingly, the probability of the persons in the vehicle feeling a start-time shock can be reduced. In addition, it is possible to prevent an incident that the own vehicle starts like dashing forward.

Also, if the down-slope gradient D is small, the increase per unit time of the creep force is made larger to further improve the acceleration performance.

Modification A7

In the Modification A7, the sensor device 3 measures, as an external force expediting the start of the own vehicle, a wind velocity fw the own vehicle receives from the back.

And, after the end of the drive force limitation, i.e., after the time t2 of FIG. 2, the drive force control part 6 increases the creep force as time passes and makes the increase per unit time of the creep force smaller as the wind velocity fw increases.

Namely, the larger the wind velocity fw (the external force expediting the start of the own vehicle), the smaller the increase per unit time of the creep force. Accordingly, the probability of the persons in the vehicle feeling a start-time shock can be reduced. In addition, it is possible to prevent an incident that the own vehicle starts like dashing forward.

Also, if the wind velocity fw is small, the increase per unit time of the creep force is large to further improve the acceleration performance.

Modification B1

In the Modification B1, the sensor device 3 measures, as an external force preventing the start of the own vehicle, a friction coefficient $\mu$ of a road surface at a position of the own vehicle.

And, as the friction coefficient $\mu$ gets larger, the drive force control part 6 makes the maximum drive force larger. As a result, the creep force is generated during the decrease of the brake force and the larger the friction coefficient $\mu$ is, the larger the creep force is, thereby further improving the acceleration performance.

Also, if the friction coefficient $\mu$ is small, the maximum drive force is also small, and therefore, the probability of the persons in the vehicle feeling a start-time shock can be reduced. In addition, it is possible to prevent an incident that the own vehicle starts like dashing forward.

Modification B2

In the Modification B2, the sensor device 3 detects, as an external force preventing the start of the own vehicle, a weight W (or the number of persons N or a load T) of the own vehicle.

And, as the weight W (or the number of persons N or the load T) gets larger, the drive force control part 6 makes the maximum drive force larger. As a result, the creep force is generated during the decrease of the brake force and the larger the weight W (or the number of persons N or the load T) is, the larger the creep force is, thereby further improving the acceleration performance.

If the weight W (or the number of persons N or the load T) is small, the maximum drive force is also small, and therefore, the probability of the persons in the vehicle feeling a start-time shock can be reduced.

Modification B3

In the modification B3, the sensor device 3 measures, as an easiness of the start of the own vehicle, a tire pressure p of the own vehicle.

And, as the pressure p gets larger, the drive force control part 6 makes the maximum drive force smaller. As a result, even if the creep force is generated during the decrease of the brake force, the larger the pressure p is, the smaller the creep force is, to reduce the probability of the persons in the vehicle feeling a start-time shock. In addition, it is possible to prevent an incident that the own vehicle starts like dashing forward.

Also, if the pressure p is small, the maximum drive force is large, to further improve the acceleration performance.

Modification B4

In the Modification B4, the sensor device 3 measures, as an external force preventing the start of the own vehicle, an up-slope gradient U. The up-slope gradient U is measurable with the use of the acceleration sensor.

And, as the up-slope gradient U gets larger, the drive force control part 6 makes the maximum drive force larger. As a result, the creep force is generated during the decrease of the brake force and the larger the up-slope gradient U is, the larger the creep force is, to further improve the acceleration performance.

Also, if the up-slope gradient U is small, the maximum drive force is also small, and therefore, the probability of the persons in the vehicle feeling a start-time shock can be reduced. In addition, it is possible to prevent an incident that the own vehicle starts like dashing forward.

Modification B5

In the Modification B5, the sensor device 3 measures, as an external force preventing the start of the own vehicle, a wind velocity aw of a wind the own vehicle receives from the front.

And, as the wind velocity aw gets larger, the drive force control part 6 makes the maximum drive force larger.

As a result, the creep force is generated during the decrease of the brake force and the larger the wind velocity aw is, the larger the creep force is, to further improve the acceleration performance.

Also, if the wind velocity aw is small, the maximum drive force is also small, and therefore, the probability of the persons in the vehicle feeling a start-time shock can be reduced. In addition, it is possible to prevent an incident that the own vehicle starts like dashing forward.

Modification B6

In the Modification B6, the sensor device 3 measures, as an external force expediting the start of the own vehicle, a down-slope gradient D of a road surface. The down-slope gradient D is measurable with the use of the acceleration sensor.

And, as the down-slope gradient D gets larger, the drive force control part 6 makes the maximum drive force smaller. As a result, even if the creep force is generated during the decrease of the brake force, the larger the down-slope gradient D is, the smaller the creep force is, to lower the probability of the persons in the vehicle feeling a start-time shock. In addition, it is possible to prevent an incident that the own vehicle starts like dashing forward.

Also, if the down-slope gradient D is small, the maximum drive force is large, to further improve the acceleration performance.

Modification B7

In the Modification B7, the sensor device 3 measures, as an external force expediting the start of the own vehicle, a wind velocity fw of a wind the own vehicle receives from the back.

And, as the wind velocity fw gets larger, the drive force control part 6 makes the maximum drive force smaller. As a result, even if the creep force is generated during the decrease of the brake force, the larger the wind velocity fw is, the smaller the creep force is, to lower the probability of the persons in the vehicle feeling a start-time shock. In addition, it is possible to prevent an incident that the own vehicle starts like dashing forward.

Also, if the wind velocity fw is small, the maximum drive force is large, to further improve the acceleration performance.

Modification C1

In the Modification C1, the sensor device 3 measures, as an external force preventing the start of the own vehicle, a friction coefficient μ of a road surface at a position of the own vehicle.

And, the larger the frictional coefficient μ, the quicker the brake force of the brake device 2 the brake force control part 5 decreases after the time t1 of FIG. 2 (the same for the Modification C2 and after). For example, a brake force decreasing gradient (a decrease per unit time, hereunder the same) is enlarged to quickly decrease the brake force of the brake device 2. As a result, even if the frictional force is large, a high acceleration performance can be realized.

Also, if the friction coefficient μ is small, the brake force is kept long, and therefore, the probability of the persons in the vehicle feeling a start-time shock can be reduced. In addition, it is possible to prevent an incident that the own vehicle starts like dashing forward.

Further, increasing the brake force threshold value as the friction coefficient μ increases can provide the same effect.

Modification C2

In the Modification C2, the sensor device 3 detects, as an external force preventing the start of the own vehicle, a weight W (or the number of persons N or a load T) of the own vehicle.

And, the larger the weight W (or the number of persons N or the load T), the quicker the brake force of the brake device 2 the brake force control part 5 decreases. For example, the brake force decreasing gradient is enlarged to quickly decrease the brake force of the brake device 2. As a result, even if the weight W (or the number of persons N or the load T) is large, a high acceleration performance is obtainable.

Also, if the weight W (or the number of persons N or the load T) is small, the brake force is kept long, and therefore, the probability of the persons in the vehicle feeling a start-time shock can be reduced.

Also, increasing the brake force threshold value as the weight W (or the number of persons N or the load T) increases will provide a similar effect.

Modification C3

In the Modification C3, the sensor device 3 measures, as an easiness of the start of the own vehicle, a tire pressure p of the own vehicle.

And, the lower the pressure p, the quicker the brake force of the brake device 2 the brake force control part 5 decreases. For example, the brake force decreasing gradient is enlarged to quickly decrease the brake force of the brake device 2. As a result, even when the pressure p is low to hinder the start of the vehicle, a high acceleration performance is obtainable.

Also, when the pressure p is high to make the start of the vehicle easier, the brake force is kept long to reduce the probability of the persons in the vehicle feeling a start-time shock. In addition, it is possible to prevent an incident that the own vehicle starts like dashing forward.

Also, increasing the brake force threshold value as the pressure p becomes lower will provide a similar effect.

Modification C4

In the Modification C4, the sensor device 3 measures, as an external force preventing the start of the own vehicle, an up-slope gradient U. The up-slope gradient U can be measured with the use of the acceleration sensor.

And, the larger the up-slope gradient U, the slower the brake force of the brake device 2 the brake force control part 5 decreases. For example, the brake force decreasing gradient is made smaller to decrease the brake force of the brake device 2 slower. For example, when the up-slope gradient U is large on an up slope, quickly decreasing the brake force results in increasing the probability of the own vehicle moving backward on the up slope. However, slowly decreasing the brake force is able to prevent such an inconvenience.

Also, when the up-slope gradient U is small, the brake force decreases faster, and therefore, a high acceleration performance is obtainable.

Also, lowering the brake force threshold value as the up-slope gradient U increases will provide a similar effect.

Modification C5

In the Modification C5, the sensor device 3 measures, as an external force preventing the start of the own vehicle, a wind velocity aw of a wind the own vehicle receives from the front.

And, the larger the wind velocity aw, the slower the brake force of the brake device 2 the brake force control part 5 decreases. For example, the brake force decreasing gradient is made smaller to decrease the brake force of the brake device 2 slower. For example, when the wind velocity aw is large, quickly decreasing the brake force results in increasing the probability of the own vehicle moving backward due to the wind. However, slowly decreasing the brake force can prevent such an inconvenience.

Also, when the wind velocity is small, the brake force decreases fast, and therefore, a high acceleration performance is obtainable.

Also, lowering the brake force threshold value as the wind velocity aw increases will provide a similar effect.

Modification C6

In the modification C6, the sensor device 3 measures, as an external force expediting the start of the own vehicle, a down-slope gradient D of a road surface. The down-slope gradient D is measurable with the use of the acceleration sensor.

And, the smaller the down-slope gradient D, the quicker the brake force of the brake device 2 the brake force control part 5 decreases. For example, the brake force decreasing gradient is enlarged to quickly decrease the brake force of the brake device 2. As a result, even when the down-slope gradient D is small so that an acceleration force by the gravitational force is small, a high acceleration performance is obtainable.

Also, when the down-slope gradient D is large, the brake force is kept long, and therefore, the probability of the persons in the vehicle feel a start-time shock can be reduced. In addition, it is possible to prevent an incident that the own vehicle starts like dashing forward.

Also, increasing the brake force threshold value as the down-slope gradient D becomes smaller will provide a similar effect.

Modification C7

In the Modification C7, the sensor device 3 measures, as an external force expediting the start of the own vehicle, a wind velocity fw of a wind the own vehicle receives from the back.

And, the smaller the wind velocity fw, the quicker the brake force of the brake device 2 the brake force control part 5 decreases. For example, the brake force decreasing gradient is increased to quickly decrease the brake force of the brake device 2. As a result, even when the wind velocity fw is small so that an acceleration force by the wind is small, a high acceleration performance is obtainable.

Also, when the wind velocity fw is large, the brake force is kept long to reduce the probability of the persons in the vehicle feeling a start-time shock. In addition, it is possible to prevent an incident that the own vehicle starts like dashing forward.

Also, increasing the brake force threshold value as the wind velocity fw decreases will provide a similar effect.

By the way, the embodiments install the vehicle control apparatus on the own vehicle. However, the vehicle control apparatus may be installed in a server device capable of communicating with the own vehicle or in a second vehicle other than the own vehicle, so that necessary information and instructions are transmitted/received between the own vehicle and the server device or the second vehicle, thereby remotely achieving a similar vehicle control method. Communication between the own vehicle and the server device is achievable by wireless communication or road-to-vehicle communication. Communication between the own vehicle and the second vehicle is achievable by so-called vehicle-to-vehicle communication.

In the above, the embodiments of the present invention are mentioned. It must not be understood that the descriptions and drawings that form a part of this disclosure limit the present invention. This disclosure will clarify, for the persons skilled in the art, various modifications, alternative embodiments, and practical techniques.

The functions mentioned in the above embodiments are achievable with one or a plurality of processing circuits.

The processing circuits include programmed processing devices including electric circuits and processing units. Also, the processing circuits include application specific integrated circuits (ASICs) arranged for executing the functions mentioned in the embodiments, devices such as conventional circuit parts, and the like.

DESCRIPTION OF REFERENCE NUMERALS

1: Drive source (Motor)
2: Brake device
3: Sensor device
4: Accelerator opening control part
5: Brake force control part (Brake keeping device)
6: Drive force control part
100: Microcomputer (Vehicle control device)
μ: Frictional coefficient of a road surface at a position of the own vehicle
W: Weight of the own vehicle
N: The number of persons in the own vehicle
T: Load of the own vehicle
p: Tire pressure of the own vehicle
U: Up-slope gradient
D: Down-slope gradient
aw: Wind velocity of a wind from the front
fw: Wind velocity of a wind from the back

The invention claimed is:

1. A vehicle control method of a vehicle control apparatus for controlling a vehicle, the vehicle including a brake device that operates based on an operation by a driver and a brake keeping device separate from the brake device that keeps the brake device operating even when the driver stops the brake operation and releases the operation of the brake device when the driver conducts a start operation, the vehicle control method comprising:

at the time of starting the vehicle, when the vehicle is stopped even without an operation of braking the vehicle, limiting a creep force to be generated before an actual start of the vehicle to or below a maximum drive force, wherein a drive force generated at the start of the vehicle includes a main drive force generated due to an accelerator opening and the creep force generated even when the accelerator opening is zero;

when the vehicle starts from a state during which the brake keeping device is operating, limiting the creep force to or below the maximum drive force until the brake force of the brake device decreases to or below a predetermined brake force threshold value but not limiting the main drive force; and when the vehicle starts from a state during which the brake device is operating based on a brake operation by the driver, increasing the creep force greater than the maximum drive force.

2. The vehicle control method as set forth in claim 1, further comprising:

after the end of the creep force limitation, increasing the creep force as time passes.

3. The vehicle control method as set forth in claim 2, further comprising:

detecting a factor influencing the start of the vehicle; and
according to the factor, controlling an increase per unit time of the creep force.

4. The vehicle control method as set forth in claim 3, further comprising:
measuring, as the factor, an external force preventing the start of the vehicle; and
enlarging the increase per unit time of the creep force as the external force preventing the start of the vehicle becomes larger.

5. The vehicle control method as set forth in claim 3, further comprising:
measuring, as the factor, an external force expediting the start of the vehicle; and
reducing the increase per unit time of the creep force as the external force expediting the start of the vehicle becomes larger.

6. The vehicle control method as set forth in claim 1, further comprising:
detecting a factor influencing the start of the vehicle; and
according to the factor, setting the maximum drive force.

7. The vehicle control method as set forth in claim 6, further comprising:
measuring, as the factor, an external force preventing the start of the vehicle; and
enlarging the maximum drive force as the external force preventing the start of the vehicle becomes larger.

8. The vehicle control method as set forth in claim 6, further comprising:
measuring, as the factor, an external force expediting the start of the vehicle; and
reducing the maximum drive force as the external force expediting the start of the vehicle becomes larger.

9. The vehicle control method as set forth in claim 1, further comprising:
detecting a factor influencing the start of the vehicle; and
according to the factor, controlling the brake force of the brake device of the vehicle.

10. The vehicle control method as set forth in claim 9, further comprising:
measuring, as the factor, an external force expediting the start of the vehicle; and
decreasing the brake force quicker as the external force expediting the start of the vehicle becomes smaller.

11. The vehicle control method as set forth in claim 3, further comprising:
measuring, as the factor, one or more of a friction coefficient of a road surface at a position of the vehicle, a weight of the vehicle, the number of persons in the vehicle, a load of the vehicle, a tire pressure of the vehicle, an inclination of the road surface, or a wind velocity of a wind the vehicle receives.

12. The vehicle control method as set forth in claim 9, further comprising:
measuring, as the factor, a friction coefficient of a road surface at a position of the vehicle, a weight of the vehicle, or the number of persons in the vehicle; and
decreasing the brake force quicker as the friction coefficient, the weight, or the number of persons in the vehicle becomes larger.

13. The vehicle control method as set forth in claim 9, further comprising:
measuring, as the factor, an up-slope gradient of a road surface at a position of the vehicle or a wind velocity of a wind the vehicle receives from the front; and
decreasing the brake force slower as the up-slope gradient or the wind velocity becomes larger.

14. The vehicle control method as set forth in claim 1, further comprising:
using a motor as a drive source of the vehicle.

15. A vehicle control apparatus for controlling a vehicle that includes a brake device operated based on a drive source and a brake operation of a driver, comprising:
a drive force controller configured to control a drive force generated by the drive source and a brake force controller configured to generate a control signal of the drive force controller; and
a brake keeping device, separate from the brake device, included in the brake force controller and configured to keep a brake device operation even when a driver stops a brake operation and configured to release the operation of the brake device when the driver conducts a start operation, wherein
the brake force controller is configured to:
at the time of starting the vehicle and when the vehicle is stopped even without an operation of braking the vehicle, limit a creep force generated before an actual start of the vehicle to or below a predetermined maximum drive force until the brake force of the brake device decreases to or below a brake force threshold value;
when the vehicle starts from a state during which the brake keeping device is operating, limit the creep force to or below the maximum drive force until the brake force of the brake device decreases to or below a predetermined brake force threshold value but does not limit a main drive force generated due to an accelerator opening; and
when the vehicle starts from a state during which the brake device is operating based on a brake operation by the driver, increase the creep force greater than the maximum drive force.

16. The vehicle control method of claim 1, further comprising:
when the vehicle starts from the state during which the brake keeping device is operating, causing the brake device to start to decrease the brake force in response to change of the accelerator opening from zero to above zero in the state during which the brake keeping device is operating, applying the main drive force corresponding to the accelerator opening to the vehicle, and limiting the creep force to or below the maximum drive force until the brake force of the brake device decreases to or below the predetermined brake force threshold value but not limiting the main drive force; and
when the vehicle starts from the state during which the brake device is operating based on the brake operation by the driver, causing the brake device to start to decrease the brake force in response to stop of the brake operation by the driver in the state during which the brake device is operating based on the brake operation by the driver, applying the main drive force corresponding to the accelerator opening to the vehicle, and generating and increasing the creep force greater than the maximum drive force.

17. The vehicle control method of claim 1, further comprising:
when the vehicle is stopped even without the operation of braking the vehicle at the time of starting the vehicle, limiting the creep force to be generated before the actual start of the vehicle to zero;
when the vehicle starts from the state during which the brake keeping device is operating, causing the brake device to start to decrease the brake force in response to change of the accelerator opening from zero to above zero in the state during which the brake keeping device is operating, applying the main drive force corresponding to the accelerator opening to the vehicle, limiting the creep force to zero until the brake force of the brake device decreases to or below the predetermined brake force threshold value but not limiting the main drive force, and generating the creep force after the end of the creep force limitation; and when the vehicle starts from the state during which the brake device is operating based on the brake operation by the driver, causing the brake device to start to decrease the brake force in response to stop of the brake operation by the driver in the state during which the brake device is operating based on the brake operation by the driver, applying the main drive force corresponding to the accelerator opening to the vehicle, and generating and increasing the creep force greater than zero.

18. The vehicle control method of claim 17, wherein limiting the creep force to zero until the brake force of the brake device decreases to or below the predetermined brake force threshold value but not limiting the main drive force comprises:

limiting the creep force to zero until the brake force of the brake device decreases to zero but not limiting the main drive force.

19. The vehicle control method of claim 1, further comprising:

when the vehicle starts from the state during which the brake keeping device is operating, causing the brake device to start to decrease the brake force in response to change of the accelerator opening from zero to above zero in the state during which the brake keeping device is operating, applying the main drive force corresponding to the accelerator opening to the vehicle, increasing the predetermined brake force threshold value as the accelerator opening increases, and limiting the creep force to or below the maximum drive force until the brake force of the brake device decreases to or below the predetermined brake force threshold value but not limiting the main drive force; and when the vehicle starts from the state during which the brake device is operating based on the brake operation by the driver, causing the brake device to start to decrease the brake force in response to stop of the brake operation by the driver in the state during which the brake device is operating based on the brake operation by the driver, applying the main drive force corresponding to the accelerator opening to the vehicle, and generating and increasing the creep force greater than the maximum drive force.

20. The vehicle control method of claim 1, further comprising:

when the vehicle is stopped even without the operation of braking the vehicle at the time of starting the vehicle, limiting the creep force to be generated before the actual start of the vehicle to zero;

when the vehicle starts from the state during which the brake keeping device is operating, causing the brake device to start to decrease the brake force in response to change of the accelerator opening from zero to above zero in the state during which the brake keeping device is operating, applying the main drive force corresponding to the accelerator opening to the vehicle, increasing the predetermined brake force threshold value as the accelerator opening increases, limiting the creep force to zero until the brake force of the brake device decreases to or below the predetermined brake force threshold value but not limiting the main drive force, and generating the creep force after the end of the creep force limitation; and when the vehicle starts from the state during which the brake device is operating based on the brake operation by the driver, causing the brake device to start to decrease the brake force in response to stop of the brake operation by the driver in the state during which the brake device is operating based on the brake operation by the driver, applying the main drive force corresponding to the accelerator opening to the vehicle, and generating and increasing the creep force greater than zero.

21. The vehicle control method of claim 16, further comprising: when the vehicle starts from the state during which the brake keeping device is operating, controlling an increase per unit time of the drive force to be approximately equivalent before and after the end of the creep force limitation by, after the end of the creep force limitation, increasing the creep force as time passes, detecting a factor influencing the start of the vehicle, and controlling an increase per unit time of the creep force according to the detected factor.

22. The vehicle control method of claim 1, further comprising:

when the vehicle is stopped even without the operation of braking the vehicle at the time of starting the vehicle, limiting the creep force to be generated before the actual start of the vehicle to zero;

when the vehicle starts from the state during which the brake keeping device is operating, limiting the creep force to zero until the brake force of the brake device decreases to or below the predetermined brake force threshold value but not limiting the main drive force; and when the vehicle starts from the state during which the brake device is operating based on the brake operation by the driver, increasing the creep force greater than zero.

23. The vehicle control method of claim 1, further comprising:

when the vehicle is stopped even without the operation of braking the vehicle at the time of starting the vehicle, limiting the creep force to be generated before the actual start of the vehicle to zero:

when the vehicle starts from the state during which the brake keeping device is operating, limiting the creep force to zero until the brake force of the brake device decreases to zero but not limiting the main drive force; and when the vehicle starts from the state during which the brake device is operating based on the brake operation by the driver, increasing the creep force greater than zero.

24. The vehicle control method of claim 1, further comprising:

when the vehicle starts from the state during which the brake keeping device is operating. controlling an increase per unit time of the drive force to be approximately equivalent before and after the end of the creep force limitation by, after the end of the creep force limitation, increasing the creep force as time passes and reducing an increase per unit time of the main drive force with respect to an increase per unit time of the main drive force before the end of the creep force limitation.

* * * * *